US008926272B2

(12) United States Patent
Schank et al.

(10) Patent No.: US 8,926,272 B2
(45) Date of Patent: Jan. 6, 2015

(54) SYSTEM FOR HEAT DISSIPATION FROM AN INTERNAL ACTUATOR IN A ROTOR BLADE

(75) Inventors: Troy C. Schank, Keller, TX (US); Monte A. McGlaun, Abilene, TX (US)

(73) Assignee: Textron Innovations Inc., Providence, RI (US)

( * ) Notice: Subject to any disclaimer, the term of this patent is extended or adjusted under 35 U.S.C. 154(b) by 612 days.

(21) Appl. No.: 13/227,181

(22) Filed: Sep. 7, 2011

(65) Prior Publication Data
US 2013/0058793 A1 Mar. 7, 2013

(51) Int. Cl.
*B64C 27/615* (2006.01)
*B64C 27/72* (2006.01)

(52) U.S. Cl.
CPC ....... *B64C 27/615* (2013.01); *B64C 2027/7266* (2013.01); *Y02T 50/34* (2013.01); *B64C 27/72* (2013.01)
USPC .......................... 415/178; 415/177; 244/17.11

(58) Field of Classification Search
CPC ........... F01D 5/18; F01D 5/185; F01D 25/08; F01D 25/12; F04D 29/5806; F04D 29/5813; B64D 15/00; B64D 15/02; B64D 15/04; B64D 15/06; B64D 15/08
USPC ........ 415/177, 178, 179; 416/95, 96 A, 96 R, 416/90 R; 244/134 R, 134 A, 134 B, 134 D
See application file for complete search history.

(56) References Cited

U.S. PATENT DOCUMENTS

| | | | | |
|---|---|---|---|---|
| 2,563,054 A | * | 8/1951 | Messinger et al. | 244/134 B |
| 6,435,454 B1 | * | 8/2002 | Engelhardt | 244/117 A |
| 6,513,762 B2 | * | 2/2003 | Fink et al. | 244/215 |
| 7,314,447 B2 | | 1/2008 | Park et al. | |
| 7,435,057 B2 | * | 10/2008 | Parera | 416/231 R |
| 7,621,720 B2 | * | 11/2009 | Nies | 416/1 |
| 2007/0001550 A1 | | 1/2007 | Palanduz et al. | |
| 2008/0206062 A1 | * | 8/2008 | Sanz Pascual et al. | 416/226 |
| 2009/0178785 A1 | | 7/2009 | Hassett et al. | |
| 2009/0250197 A1 | | 10/2009 | Hassett et al. | |
| 2012/0085867 A1 | * | 4/2012 | Bardwell | 244/134 B |

(Continued)

FOREIGN PATENT DOCUMENTS

| | | |
|---|---|---|
| DE | 202004006333 U1 | 6/2004 |
| GB | 1526160 | 9/1978 |
| WO | WO 2010128299 A1 * | 11/2010 |

OTHER PUBLICATIONS

Extended European Search Report in counterpart European Application No. 11185125.9-2422, mailed by the European Patent Office on Dec. 16, 2011, 4 pages.

(Continued)

*Primary Examiner* — Edward Look
*Assistant Examiner* — Christopher R Legendre
(74) *Attorney, Agent, or Firm* — James E. Walton; Brian E. Harris

(57) ABSTRACT

A rotor blade for an aircraft includes an airfoil skin, an active element, and an actuator configured to operate the active element. A heat pipe is configured to promote heat transfer from the actuator to the airfoil skin. The heat pipe has a slope gradient such that a centrifugal force generated during rotation of the rotor blade promotes travel of a condensed working fluid within the heat pipe to move from a condenser end of the heat pipe toward an evaporator end of the heat pipe.

17 Claims, 5 Drawing Sheets

(56) References Cited

U.S. PATENT DOCUMENTS

| | | | |
|---|---|---|---|
| 2013/0058793 A1* | 3/2013 | Schank et al. | 416/96 A |
| 2013/0094959 A1* | 4/2013 | Scott | 416/1 |
| 2014/0060249 A1* | 3/2014 | Schank et al. | 74/99 R |
| 2014/0064960 A1* | 3/2014 | Schank et al. | 416/1 |
| 2014/0064965 A1* | 3/2014 | Schank et al. | 416/23 |

OTHER PUBLICATIONS

Office Action dated Aug. 1, 2014 from counterpart CN App. No. 201210032773.9.

* cited by examiner

SYSTEM FOR HEAT DISSIPATION FROM AN INTERNAL ACTUATOR IN A ROTOR BLADE

BACKGROUND

1. Field of the Invention

The present application relates to heat dissipation from within a rotor blade.

2. Description of Related Art

It can be desirable to have active elements within a rotor blade in order make aerodynamic changes to the rotor blade during flight. An active element may include an actuator configured to actuate a rotor blade flap, for example. One challenge in rotor blade design is to effectively remove heat generated by the actuator so as to ensure that the rotor blade structure is not compromised from the heat generated from the actuator.

Although there have been significant developments in rotor blade design, significant room for improvement remains.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
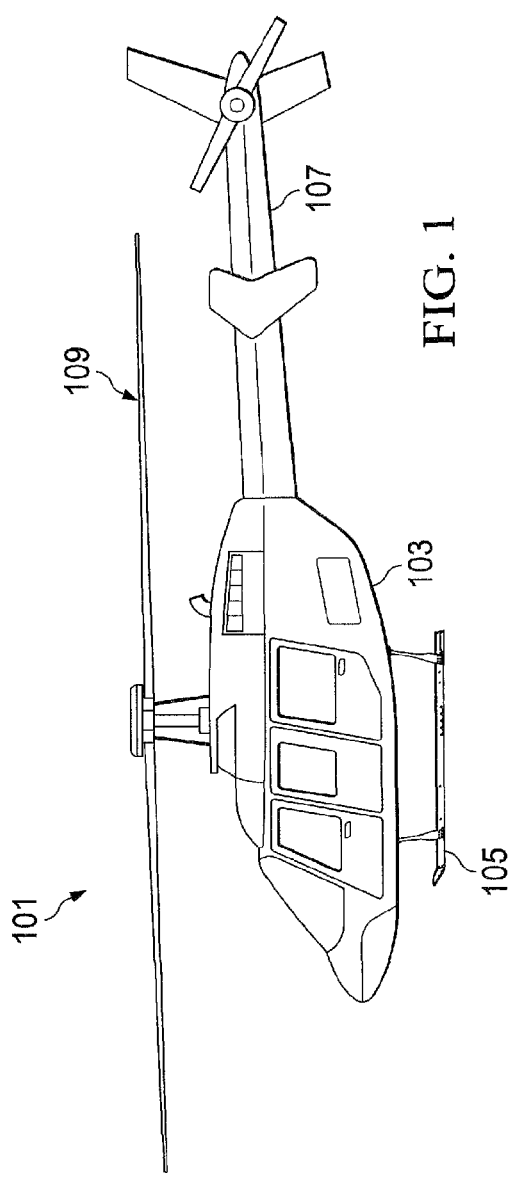
FIG. 1 is a side view of an aircraft according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application utilizes a heat pipe as a heat transfer device to remove heat produced by an actuator located within a rotor blade. A typical heat pipe consists of a sealed hollow tube made of a thermally conductive material, such as copper or aluminum. The heat pipe uses a relatively small quantity of "working fluid" or coolant (such as water, ethanol, or mercury) with the remainder of the heat pipe being filled with a vapor phase of the working fluid. Heat is transferred from an evaporator end of a heat pipe to an opposing condenser end of the heat pipe by a rapid transition of heat vaporized working fluid from the evaporator end to the condenser end.

Further, heating the evaporator end of the heat pipe will cause the working fluid inside the heat pipe at the evaporator end to turn to vapor, thereby increasing the vapor pressure inside the heat pipe. Latent heat of evaporation absorbed by the vaporization of the working fluid reduces the temperature at the evaporator end of the heat pipe. Moreover, the vapor pressure at the evaporator end of the heat pipe is higher than the equilibrium vapor pressure at the condenser end of the heat pipe. This pressure difference drives a mass transfer of the heated vaporized working fluid from the evaporator end to the condenser end of the heat pipe where the vapor condenses, thereby releasing its latent heat and heating the condenser end of the heat pipe. The condensed working fluid then flows back to the evaporator end of the heat pipe.

However, the length of the heat pipes can be limited by difficulties encountered in moving the condensed working fluid from the condenser end of the heat pipe to the evaporator end. Therefore, in some instances, heat pipes can contain a wick that returns the working fluid to the evaporator end by capillary action. Such wicks typically consist of metal powder sintered onto the inside walls of the heat pipe, but can be any material capable of soaking up the working fluid. Wicks can aid in returning the condensed working fluid to the evaporator end; however, limitations in heat pipe length can still exist as a result of difficulties in returning the condensed fluid to the evaporator end of the heat pipe.

For example, gravitational forces, or absence thereof, can impede or assist movement of the condensed working fluid from the condenser end to the evaporator end of the heat pipe. Such gravitation limitations are generally a function of orientation of the heat pipe. In the case of heat pipes that are vertically-oriented with the evaporator end down, the fluid movement is assisted by the force of gravity. For this reason, heat pipes can be the longest when vertically oriented with the evaporator end of the heat pipe below the condenser end. The length of a heat pipe is typically most limited when the heat pipe is vertically oriented with the evaporator end of the heat pipe above the condenser end. In this orientation, gravity attracts the condensed fluid to the condenser end of the heat pipe rather than the evaporator end.

As such, the length of the heat pipe can be a design limitation. In U.S. patent application Ser. No. 12/352,301, filed Jan. 12, 2009, which is hereby incorporated by reference, seeks to maximize an effective heat pipe length by sequentially locating a plurality of heat pipes longitudinally adjacent to each other.

The system of the present application includes a heat pipe in a rotor blade of a rotorcraft. The heat pipe is configured to utilize the centrifugal force, generated by rotation of the rotor blade, to promote fluid movement from the condenser end of the heat pipe to the evaporator end of the heat pipe. In one embodiment, the heat pipe is configured to utilize the centrifugal force to promote fluid movement from the condenser end of the heat pipe to the evaporator end of the heat pipe, so that the heat pipe length can be long enough to enable coupling of the heat pipe to multiple areas of the heat sink structures. In one embodiment, the heat pipe is oriented such that the condenser end of the heat pipe is located below the evaporator end of the heat pipe, but the configuration of the heat pipe promotes fluid movement from the condenser end of the heat pipe to the evaporator end of the heat pipe, so as to overcome the negative effect of gravity on fluid movement within the heat pipe.

Referring to FIG. 1, an aircraft 101 is illustrated. Aircraft 101 includes a fuselage 103, a landing gear 105, and a tailboom 107. Aircraft 101 is a rotorcraft having a plurality of rotor blades 109. Aircraft 101 is illustrated as a conventional rotorcraft; however, it should be appreciated that aircraft 101 may be of a variety of aircraft types, including a tiltrotor aircraft, gyrocopter, unmanned rotorcraft, to name a few.

Figure 2:
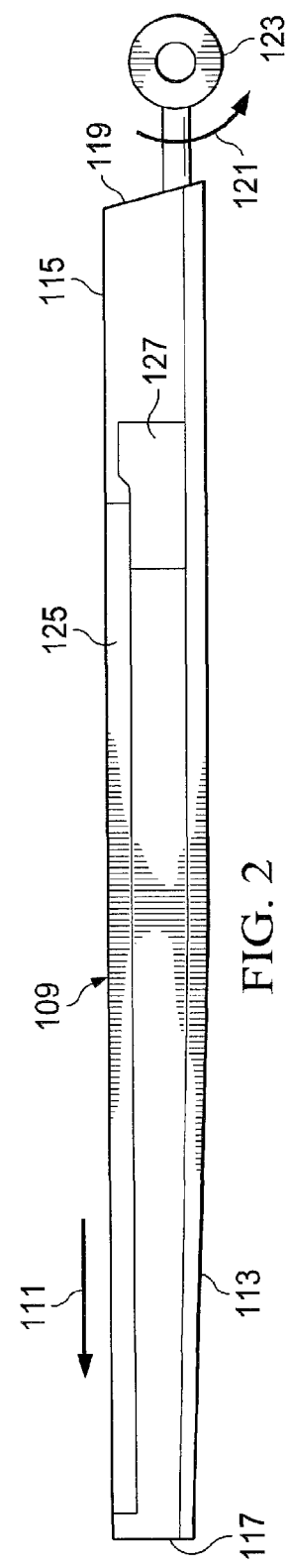
FIG. 2 is a top view of a rotor blade, according to the preferred embodiment of the present application.
Figure 3:
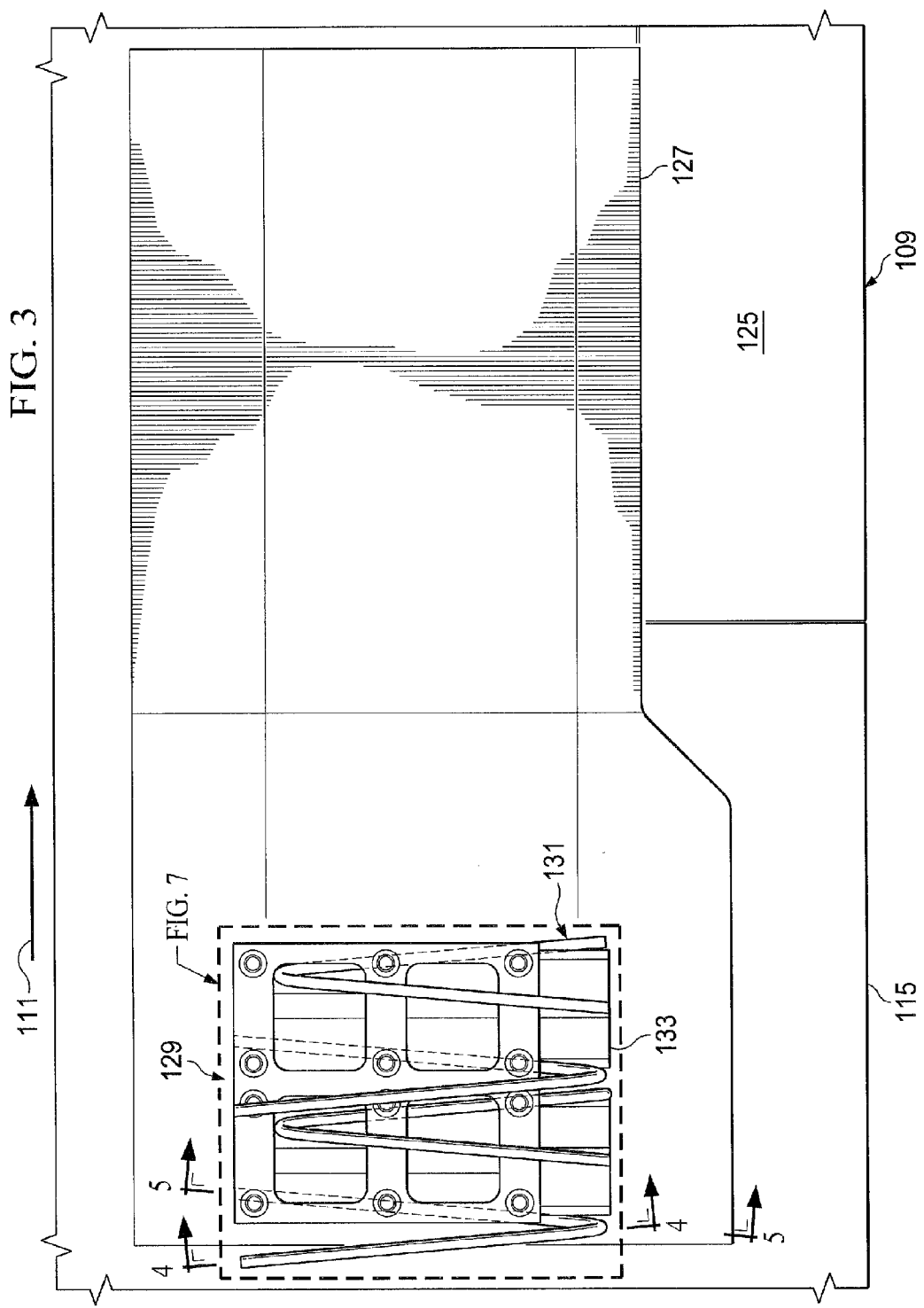
FIG. 3 is a partial top view of the rotor blade, according to the preferred embodiment of the present application.
Figure 4:
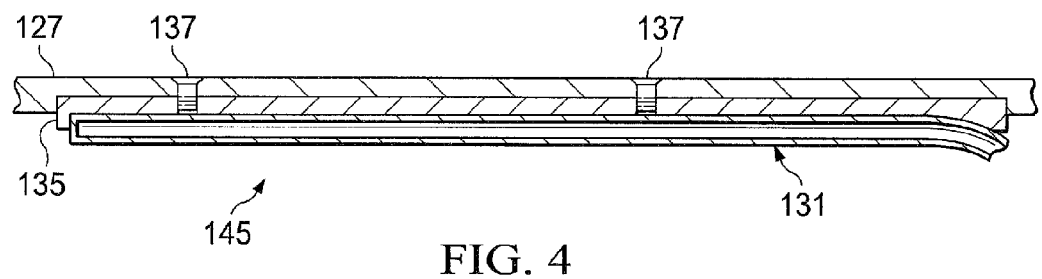
FIG. 4 is a section view, taken at section lines 4-4 in FIG. 3.
Figure 5:
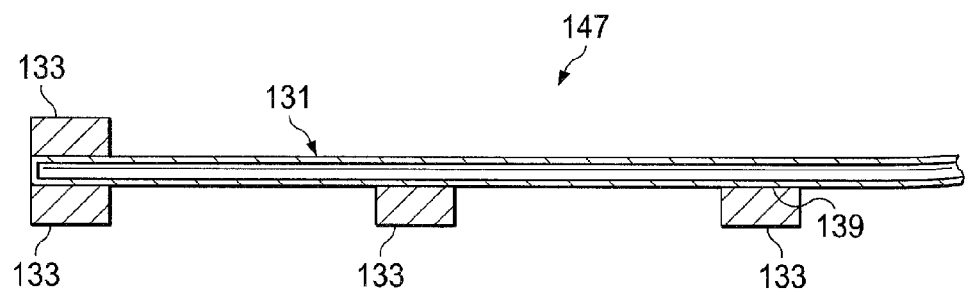
FIG. 5 is a section view, taken at section lines 5-5 in FIG. 3.
Figure 6:
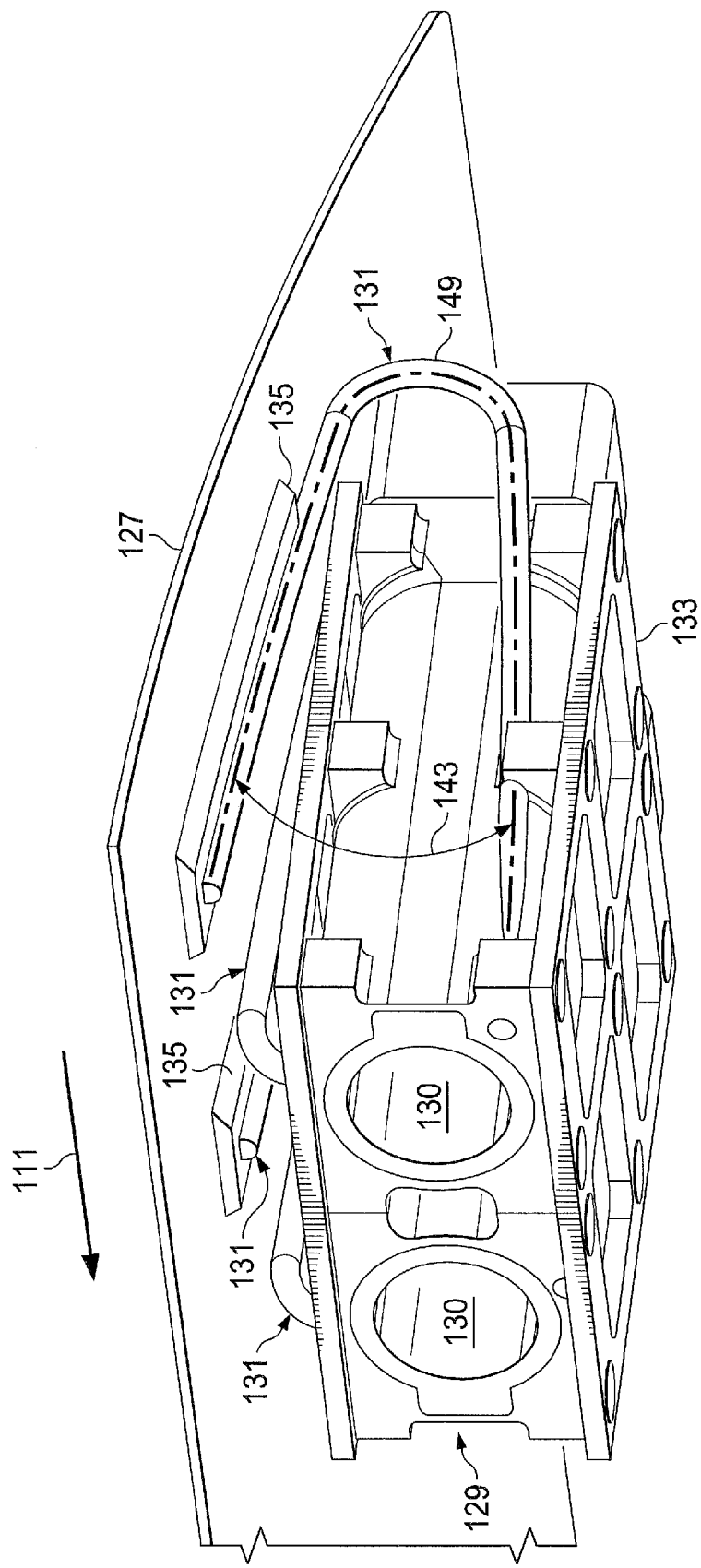
FIG. 6 is a perspective view of the system, according to the preferred embodiment of the present application.
Figure 7:
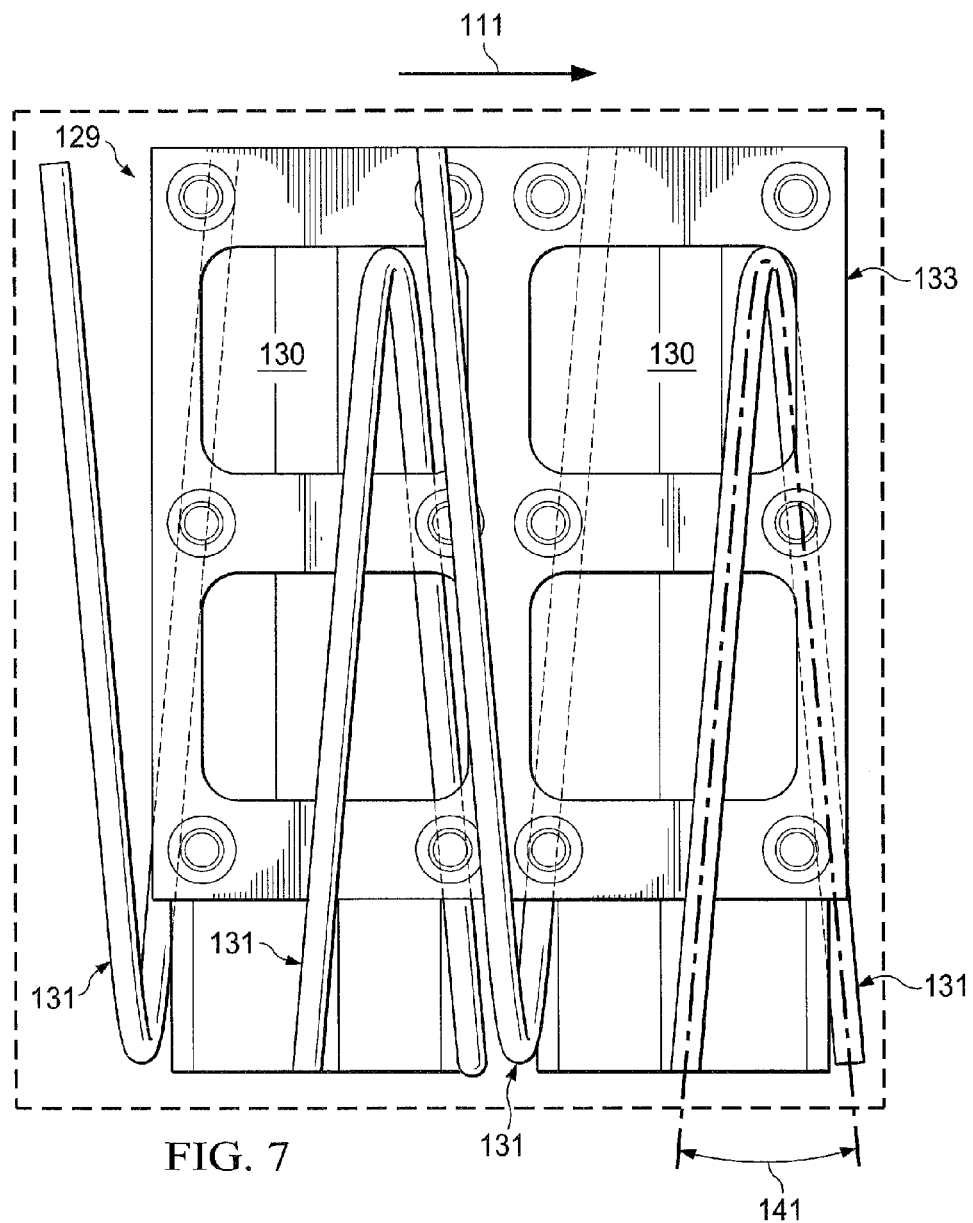
FIG. 7 is a top view of the system, according to the preferred embodiment of the present application.

Referring now to FIG. 2, a rotor blade 109 is illustrated. It should be appreciated that even though only a single rotor blade 109 is illustrated, aircraft 101 may have a plurality of rotor blades. Rotor blade 109 is coupled to a rotor hub 123, which is operably coupled to a rotor mast, such that rotor blade 109 is rotated in a rotation direction 121. During operation, rotation of rotor blade 109 produces a centrifugal force ("CF") 111. CF 111 is approximately parallel to a spanwise direction of rotor blade 109. It should be appreciated that the direction and magnitude of CF 111 may vary in accordance with certain flight regimes of aircraft 101. In the illustrated embodiment, rotor blade 109 can include a trailing edge flap 125, which is an active flap that is actuated by an actuator 129 (shown in FIG. 3). An actuator cover 127 is configured as a heat dissipating cover that has an exposed exterior surface that forms a partial airfoil surface of rotor blade 109. Rotor blade 109 has an airfoil skin around an internal rotor blade structure. Rotor blade 109 includes a leading edge 113, a trailing edge 115, a root end 119, and a tip end 117. Rotor blade 109 can be of a variety of airfoil shapes. For example, rotor blade 109 can have built in twist, such that the angle of attack at root end 119 is greater than the angle of attack at tip end 117. For clarity, rotor blade 109 is illustrated as having zero twist.

In the illustrated embodiment, trailing edge flap 125 can be actuated at a rapid rate by actuator 129. For example, trailing edge flap 125 can be actuated one or more times within a single revolution of rotor blade 109 around a mast axis of rotation. Actuation of trailing edge flap 125 by actuator 129 typically produces a large amount of heat proximate to actuator 129. It is important to facilitate removal of the heat in order to ensure proper function and longevity of actuator 129 and structure of rotor blade 109. It should be appreciated that trailing edge flap 125 is merely illustrative of one of a variety of active elements that may be actuated by actuator 129.

Referring now also to FIGS. 3-7, actuator 129 can be of a variety of motion actuation devices. For example, actuator 129 can be any number of electric motors, hydraulic devices, pneumatics motors, to name a few. In the preferred embodiment, actuator 129 includes two separate electric linear motors, each motor having a stator 130. The two stators 130 are located in a heat sink 133. Heat sink 133 is preferably made from a heat conductive material, such as aluminum, for example. Heat sink 133 is configured to structurally support stators 130, as well as absorb heat produced by stators 130.

A plurality of heat pipes 131 are configured to provide efficient heat transfer from heat sink 133 to actuator cover 127. Each heat pipe 131 includes an evaporator end 147 and a condenser end 145. The evaporator end 147 is in thermal contact with heat sink 133. A thermal grease 139 can be used to promote thermal contact between the evaporator end 147 and heat sink 133. The condenser end 145 is in thermal contact with actuator cover 127, via a saddle 135. The condenser end 145 is preferably soldered to saddle 135. Saddle 135 is preferably a heat conductive material, such as copper or aluminum, for example. Actuator cover 127 includes a slot for receiving each saddle 135, each slot being slightly larger than each saddle 135. Fasteners, such as fasteners 137, can be used to couple saddle 135 to actuator cover 127. Thermal grease can be used to promote thermal contact between each saddle 135 and the actuator cover 127.

During operation, each heat pipe 131 transfers heat from heat sink 133 to actuator cover 127, where the heat can dissipate into the ambient air. Further, airflow over the exterior surface of actuator cover 127 acts to further remove heat from actuator cover 127. In the preferred embodiment, actuator cover 127 is made of a lightweight material also having a high thermal conductivity, such as aluminum.

Each heat pipe 131 is formed at an angle 141 to the spanwise direction of rotor blade 109, such that CF 111 promotes condensed fluid to travel from condenser end 145 to evaporator end 147. Heat pipe 131 is configured to have a slope so that CF 111 promotes the return of the condensed working fluid from condenser end 145 to evaporator end 147. In the illustrated embodiment, angle 141 is approximately 10-12°; however, it should be appreciated that angle 141 may be any angle that sufficiently allows CF 111 to promote the return of the condensed working fluid from condenser end 145 to evaporator end 147. Each heat pipe 131 is formed at an angle 143. In the illustrated embodiment, angle 143 is approximately 10°; however, it should be appreciated that other embodiments may have an angle 143 other than 10°. Angle 143 is formed by a bend 149 located approximately mid-length of heat pipe 131. The angle of bend 149 is configured so that condenser end 145 can approximately conform to the surface of actuator cover, thus having maximum contact area with saddle 135. Further, the angle of bend 149 is also configured so that evaporator end 147 can have maximum contact area with heat sink 133. The thickness and camber of rotor blade 109 can affect the specific angle of bend 149. For example, a rotor blade having a small thickness between upper and lower airfoil surfaces may have a smaller angle 143, as compared to a rotor blade having a large thickness between upper and lower airfoil surfaces.

In the illustrated embodiment, the exterior surface of actuator cover 127 forms an upper airfoil surface of rotor blade 109; however, in an alternative embodiment an exterior surface of actuator cover 127 may form a lower airfoil surface. As discussed herein, it is undesirable to have the evaporator end of the heat pipe above the condenser end of the heat pipe due to the condensed working fluid having to overcome the force of gravity. However, the system of the present application can utilize CF 111 to overcome the undesirable force of gravity.

The system of the present application provides significant advantages, including: (1) providing a system that utilizes a heat pipe to remove heat from an actuator in a rotor blade; and (2) utilizing centrifugal force in a rotor blade to facilitate movement of condensed working fluid from the condenser end to the evaporator end of the heat pipe.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A rotor blade for an aircraft, the rotor blade comprising:
an airfoil skin;
an active element;
an actuator configured to operate the active element; and
a heat pipe configured to promote heat transfer from the actuator to the airfoil skin;
wherein the heat pipe has a slope gradient such that a centrifugal force generated during rotation of the rotor blade promotes travel of a condensed working fluid within the heat pipe to move from a condenser end toward an evaporator end.

2. The rotor blade according to claim 1, wherein the condenser end of the heat pipe is thermally coupled to a cover, the cover having an exterior surface that forms a portion of the airfoil skin.

3. The rotor blade according to claim 2, wherein the cover forms part of an upper exterior surface of the airfoil skin.

4. The rotor blade according to claim 2, wherein the cover forms part of a lower exterior surface of the airfoil skin.

5. The rotor blade according to claim 1, wherein the heat pipe has a bend approximately mid-length of the heat pipe, such that the condenser end of the heat pipe approximately aligns with a portion of an airfoil surface defined by the airfoil skin.

6. The rotor blade according to claim 1, wherein the condenser end of the heat pipe is closer to a root end of the rotor blade, as compared to the evaporator end of the heat pipe.

7. The rotor blade according to claim 1, wherein the evaporator end of the heat pipe is coupled to a heat sink that houses the actuator.

8. The rotor blade according to claim 1, wherein the condenser end of the heat pipe has a thermal path to the airfoil skin.

9. A system for a rotor blade, the system comprising:
an actuator;
a cover forming a partial airfoil surface of the rotor blade;
a heat pipe having a condenser end and an evaporator end; and
a heat sink in thermal contact with the actuator;
wherein the heat pipe is configured to transfer heat from the actuator to the cover.

10. The system according to claim 9, wherein the actuator is configured to produce heat during operation.

11. The system according to claim 9, further comprising:
a trailing edge flap on the rotor blade;
wherein the actuator is configured to produce heat during an actuation of the trailing edge flap.

12. The system according to claim 9, wherein the actuator includes a linear motor stator.

13. The system according to claim 9, wherein the evaporator end of the heat pipe is closer to a tip end of the rotor blade as compared to the condenser end of the heat pipe, thereby allowing a centrifugal force to promote transfer of a condensed working fluid from the condenser end to the evaporator end, the centrifugal force being generated by rotation of the rotor blade.

14. The system according to claim 9, wherein the heat pipe is angled so that a centrifugal force promotes transfer of a condensed working fluid from the condenser end of the heat pipe to the evaporator end of the heat pipe, the centrifugal force being generated by rotation of the rotor blade.

15. The system according to claim 9, wherein the heat pipe is in thermal contact with a saddle, the saddle being releasably coupled to the cover.

16. The system according to claim 9, wherein the cover has an exterior surface, the exterior surface being exposed to airflow during operation of the rotor blade, such that the airflow acts to promote heat transfer from the cover to ambient air.

17. The system according to claim 9, wherein the evaporator end of the heat pipe is located below the condenser end of the heat pipe.

* * * * *